United States Patent
Atarashi

[19]

[11] Patent Number: 5,929,578
[45] Date of Patent: Jul. 27, 1999

[54] CONTROL PROCESS IN A MOTOR DRIVING CONTROL UNIT

[75] Inventor: Hirofumi Atarashi, Saitama, Japan

[73] Assignee: Honda Giken Kabushiki Kaisha, Tokyo, Japan

[21] Appl. No.: 09/035,513

[22] Filed: Mar. 5, 1998

[30] Foreign Application Priority Data

Mar. 5, 1997 [JP] Japan .................................... 9-050355

[51] Int. Cl.⁶ .............................. H02P 7/36; B60L 11/18
[52] U.S. Cl. .......................... 318/430; 318/254; 318/433; 318/434
[58] Field of Search ...................................... 318/138, 139, 318/254, 245, 430–439; 364/424.02, 424.01, 424.06, 426.02; 180/65.1, 65.8, 446, 587

[56] References Cited

U.S. PATENT DOCUMENTS

| | | | |
|---|---|---|---|
| 5,063,510 | 11/1991 | Jurgens et al. | 364/424.01 |
| 5,365,431 | 11/1994 | Minezawa et al. | 364/424.01 |
| 5,376,868 | 12/1994 | Toyoda et al. | 318/587 |
| 5,471,384 | 11/1995 | Nakashima et al. | 364/424.01 |
| 5,731,669 | 3/1998 | Shimizu et al. | 318/139 |
| 5,740,880 | 4/1998 | Miller | 180/446 |

FOREIGN PATENT DOCUMENTS 5-153705   6/1993   Japan .

*Primary Examiner*—Paul Ip
*Attorney, Agent, or Firm*—Lyon & Lyon LLP

[57] ABSTRACT

A control command value map is formed with a voltage applied to a motor and an output torque as an output command value from a driver being taken on axes of coordinates, so that an output command value suitable for a power source voltage is easily and rapidly provided regardless of a variation in voltage of a motor driving power source by applying an output command value determined from the control command value map from an output command value determining means to a driving means. The motor can be driven based on such output command value.

12 Claims, 8 Drawing Sheets

CONTROL PROCESS IN A MOTOR DRIVING CONTROL UNIT

BACKGROUND OF THE INVENTION

1. Field of the Invention

The present invention relates to a control process suitable for a motor driving control unit for a motor having a relatively small power source capacity and a relatively low normal load, and exhibiting a relatively high required maximum output.

2. Description of the Related Art

There is a known control process in the motor driving control unit, which is generally called a map control process. In this map control process, control values based on characteristic data for the motor are previously stored on a map, and a control value is read from the map in accordance with an operational state and interpolated to give a motor driving signal. The map control processes include one example disclosed, for example, in Japanese Patent Application Laid-open No. 5-153705.

In an electric vehicle, a solar car or the like, the power source capacity of a motor driving power source is relatively small and for this reason, the power source voltage of the motor driving power source is largely varied due to a variation in load, a load driving time, a charging by receiving of a regenerative operation and the like. In the map control process described in Japanese Patent Application Laid-open No. 5-153705, to deal with such variation in power source voltage, a plurality of power source voltages of the motor driving power source are previously set and a plurality of control command value maps corresponding to the power source voltages are previously made, so that an output command value is provided in accordance with the variation in power source voltage from a corresponding control command value map, or if the corresponding control command value map does not exist, then an interpolating calculation is carried out to provide an output command value. Therefore, to perform a motor driving control with a high accuracy and a high efficiency, not only an increased memory capacity, but also a high calculation speed is required, bringing about increases in size and cost of the control unit, and resulting in an increased number of steps of sampling characteristic data. In the existing circumstances, therefore, reductions in control accuracy and efficiency are permitted to reduce the number of control command value maps established to a relatively small number, and it is obliged to use a control unit having a relatively low calculation speed.

SUMMARY OF THE INVENTION

Accordingly, it is an object of the present invention to provide a control process in a motor driving control unit, wherein an output command value suitable for a power source voltage can be provided easily and rapidly, regardless of a variation in power source voltage of a motor driving power source, and a motor can be driven based on such output command value.

To achieve the above object, according to a first aspect and feature of the present invention, there is provided a control process in a motor driving control unit comprising an output command value determining means which includes a control command value map where output command values determined based on characteristic data for a motor are stored, and which outputs an output command value read from the control command value map in accordance with an output command value from a driver of the vehicle, and a driving means for driving the motor based on the output command value outputted from the output command value determining means, wherein the control command value map is formed with a voltage applied to the motor and an output torque as the output command value from the driver being taken on axes of coordinates, and an output command value determined from the control command value map is applied from the output command value determining means to the driving means.

The applied voltage to the motor and the output torque from the motor are proportional to each other, and even if a variation in power source voltage is generated, the output torque can be maintained constant by carrying out a control for maintaining the applied voltage constant. Therefore, by the fact that the control command value map with the applied voltage and the output torque taken on the axes of the coordinates is previously formed according to the present invention, an output command value for providing an output torque indicated by the driver can be obtained easily and rapidly regardless of a variation in power source voltage by only carrying out a simple processing for providing an applied voltage.

According to a second aspect and feature of the present invention, in addition to the first feature, a number of revolutions of the motor and an actual power source voltage of a motor driving power source are detected, and a voltage applied to the motor by the driving means is calculated based on at least the detected number of revolutions and power source voltage. Thus, a counter electromotive force produced in the motor can be subtracted from the actual power source voltage of the motor driving power source to provide an applied voltage. In addition, the applied voltage can be easily obtained by the fact that the counter electromotive force is proportional to the number of revolutions of the motor.

According to a third aspect and feature of the present invention, in addition to the second feature, the applied voltage e to the motor is calculated according to equations, $E=Ke \cdot Nreal$ and $e=Vreal-Ereal$, wherein E represents a counter electromotive force of the motor; Ke represents a counter electromotive force constant for the motor; Ereal represents a counter electromotive force generated in the motor; Vreal represents an actual power source voltage; and Nreal represents a detected number of revolutions of the motor.

According to a fourth aspect and feature of the present invention, there is provided a control process in a motor driving control unit comprising an output command value determining means which includes a control command value map where output command values determined based on characteristic data for a motor are stored, and which outputs an output command value read from the control command value map in accordance with an output command value from a driver, and a driving means for driving the motor based on the output command value outputted from the output command value determining means, wherein the control command value map is previously formed with the output torque as the output command value from the driver and the number of revolutions of the motor being taken on axes of coordinates, in a state in which the voltage of the motor driving power source for the motor assumes a reference voltage; a searching number of revolutions is determined based on a counter electromotive force constant for the motor, the reference voltage, an actual power source voltage of the motor driving power source and an actual number of revolutions of the motor; and an output command value obtained from the control command value map in correspondence to the searching number of revolutions and the output torque is applied from the output command value determining means to the driving means.

The voltage applied to the motor is proportional to the output torque from the motor, and even if a variation in power source voltage is generated, an output torque indicated by a driver can be obtained by carrying out a control for maintaining the applied voltage constant. On the other hand, a counter electromotive force generated in the motor can be subtracted from the power source voltage of the motor driving power source to provide the applied voltage, and the number of revolutions of the motor and the counter electromotive force constant are integrated to provide a counter electromotive force. Therefore, to maintain the applied voltage constant, the number of revolutions of the motor required to provide the output torque uniform on the control command value map set in the state in which the motor driving power source is at a reference voltage may be determined in accordance with the varied power source voltage. Thus, it is possible to provide a number of revolutions of the motor required in accordance with the varied power source voltage, based on the counter electromotive force constant, the reference voltage, the actual power source voltage and the actual number of revolutions of the motor, and to provide an output torque indicated by the driver regardless of a variation in power source voltage by providing an output command value from the control command value map using such number of revolutions of the motor as a searching number of revolutions. Moreover, the control command value map with the number of revolutions of the motor and the output torque taken on the axes of the coordinates conventionally exists and hence, it is possible to easily and rapidly provide an output command value corresponding to a power source voltage using such conventional control command value map without preparation of a large number of control command value maps dealing with the variation in power source voltage.

According to a fifth aspect and feature of the present invention, in addition to the fourth feature, a searching number of revolutions Nx is calculated according to an equation, $Nx=\{(Vmap-Vreal)/Ke\}+Nreal$, wherein Vmap represents a reference voltage of the motor driving power source; Ke represents a counter electromotive force constant for the motor; Vreal represents an actually detected power source voltage of the motor driving power source; and Nreal represents an actually detected number of revolutions of the motor. Thus, to maintain the applied voltage constant, it is necessary to satisfy an equation, $\Delta V=(Vmap-Vreal)=Ke \cdot (Nx-Nreal)$, wherein $\Delta V$ represents a value of variation in power source voltage from the reference voltage of the motor driving power source. By changing this equation, it is possible to provide an equation, $Nx=\{(Vmap-Vreal)/Ke\}+Nreal$ according to the present invention and thus, it is possible to simply provide the searching number Nx of revolutions from Vmap, Ke, Vreal and Nreal. It is possible to easily perform a logic post-installation to the conventionally existing control unit having the control command value map with the number of revolutions of the motor and the output torque taken on the axes of the coordinates.

According to a sixth aspect and feature of the present invention, in addition to the fourth feature, a searching number Nx of revolutions of the motor is calculated according to an equation, $Nx=(Vmap \cdot Nreal)/Vreal$, wherein Vmap represents a reference voltage of the motor driving power source; Vreal represents an actually detected power source voltage of the motor driving power source; and Nreal represents an actually detected number of revolutions of the motor. Thus, in a range in which the voltage of the motor driving power source and the number of revolutions of the motor are limited, it is possible to provide an appropriate output command value corresponding to a variation in power source voltage by finding a searching number Nx of revolutions which satisfies the equation, $Nx=(Vmap \cdot Nreal)/Vreal$, and it is possible to further simplify the calculation of the searching number Nx of revolutions. The above and other objects, features and advantages of the invention will become apparent from the following description of the preferred embodiments taken in conjunction with the accompanying drawings.

BRIEF DESCRIPTION OF THE DRAWINGS

FIGS. 1 to 4 illustrate a first embodiment of the present invention, wherein

FIG. 1 is an illustration of the entire arrangement of a motor control circuit;

FIG. 2 is an illustration of the relationship between the number of revolutions of the motor and the counter electromotive force;

FIG. 3 is an illustration of a control command value map;

FIG. 4 is a block diagram illustrating the arrangement of a control unit;

FIGS. 6 to 8 illustrate a third embodiment of the present invention, wherein

FIG. 6 is an illustration of a control command value map;

FIG. 7 is an illustration of the relationship between the applied voltage, the output torque, and number of revolutions;

FIG. 8 is a block diagram of the arrangement of a control unit of this third embodiment.

DETAILED DESCRIPTION OF THE PREFERRED EMBODIMENTS

Figure 1:
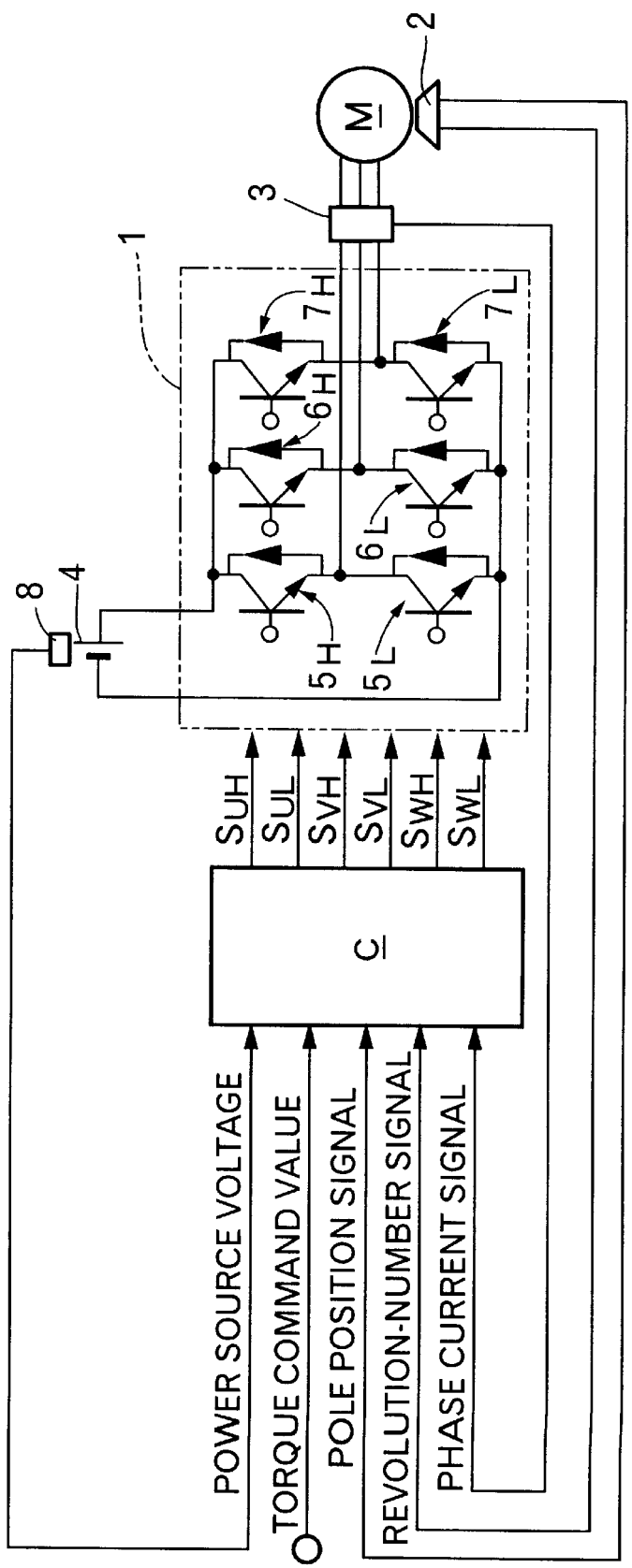

A first embodiment of the present invention will now be described with reference to FIGS. 1 to 4. Referring first to FIG. 1, a motor M is a brushless motor of a 3-phase permanent magnet type mounted, for example, on a solar energy powered car. An electric power supplied to the motor M is controlled by a 3-phase inverter circuit 1 as a driving means, based on an output command value from a control unit C having a function as an output command value determining means. A motor driving power source 4 having a small capacity such as a battery or capacitor of a small-capacity is connected to the 3-phase inverter circuit 1.

The 3-phase inverter circuit 1 is conventionally known and includes a U-phase upper arm $5_H$, a U-phase lower arm $5_L$, a V-phase upper arm $6_H$, a V-phase lower arm $6_L$, a W-phase upper arm $7_H$, and a W-phase lower arm $7_L$. Driving signals $S_{UH}$, $S_{UL}$, $S_{VH}$, $S_{VL}$, $S_{WH}$ and $S_{WL}$ indicative of commands to individually drive the arms $5_H$, $5_L$, $6_H$, $6_L$, $7_H$ and $7_L$ respectively in an ON-OFF manner are inputted from the control unit C to the 3-phase inverter circuit 1.

Inputted to the control unit C are a pole position signal and a revolution-number signal provided by a pole position/revolution-number detecting sensor 2 mounted to the motor M, a phase current signal provided by phase current detector 3 mounted between the 3-phase inverter circuit 1 and the motor M, and an output voltage from the motor driving power source 4, i.e., a power source voltage, provided by a power source voltage detector 8, as well as a torque command value based on the amounts of depression of an accelerator pedal and a brake pedal (not shown) as an output command value from a driver.

The control unit C includes a control command value map, where among a current value, an advance value, a current supply angle and a wave form of a phase current, at least the current value or, more desirably, the current value and the advance value are determined as output command values based on characteristics of the motor M. Each of the driving signals $S_{UH}$, $S_{UL}$, $S_{VH}$, $S_{VL}$, $S_{WH}$ and $S_{WL}$ is outputted in accordance with an output command value read from the control command value map based on the pole position signal, the revolution-number signal, the phase current signal, the power source voltage and the torque command value, so that an optimal output power is obtained in the motor M.

If the power source voltage of the motor M is represented by V, and the counter electromotive force of the motor M is represented by E, a voltage e applied to the motor M is represented by the following equation:

$$e = V - E \quad (1)$$

If the number of revolutions of the motor M is represented by N, and the counter electromotive force constant of the motor M is represented by Ke, the counter electromotive force E is represented by the following equation:

$$E = Ke \cdot N \quad (2)$$

Figure 2:
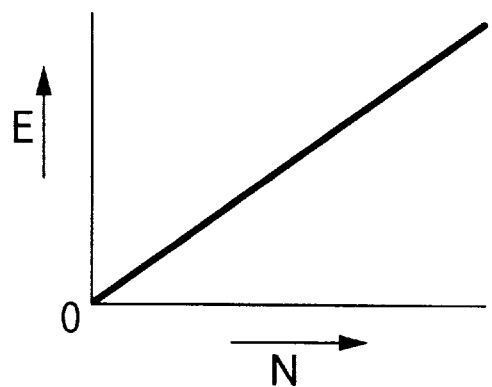

The counter electromotive force E is proportional to the number N of revolutions of the motor M, as shown in FIG. 2. Therefore, from the above equations (1) and (2), the following equation is derived:

$$e = V - Ke \cdot N \quad (3)$$

On the other hand, a motor M used in an electric vehicle, a solar car or the like is driven by a torque control, and if a current applied to the motor M is represented by I and a torque constant is represented by Kt, a torque T generated by the motor M is represented by the following equation:

$$T = Kt \cdot I \quad (4)$$

If an impedance resulting from addition of a resistance value, an inductance and another distribution capacity in the motor M is represented by Z, the current I is represented by the following expression:

$$I (e/Z) \quad (5)$$

From the above expressions (4) and (5), the following expression is derived:

$$T\ Kt \cdot (e/Z) \quad (6)$$

Therefore, the following expression is established:

$$T\ e(=V-E) \quad (7)$$

The torque T is proportional to the applied voltage e.

Thus, if a control for maintaining the applied voltage from the motor M can be maintained constant, even if a variation in power source voltage V is generated. Therefore, the control command value map is previously established in the control unit C, where the output command value has been determined for at least the current value or, more desirably, for the current value and the advance value among the current value, the advance value, the current supply angle and the wave form of the phase current, at an intersection of a mesh on coordinates with the applied voltage e taken on the axis of abscissas and the output torque T taken on the axis of ordinate. In establishing this map, the current value, the advance value, the current supply angle and the wave form of the phase current based on the applied voltage e and the output torque T in a state where the voltage of the motor driving power source 4 is defined as a reference voltage, may be determined. The control command value map where the output torque T is on a plus side, i.e., on a driving side, is illustrated in FIG. 3, but a control command value map where the output torque T is on a minus side, i.e., on a regenerative side, may be established in the same manner.

Figure 3:
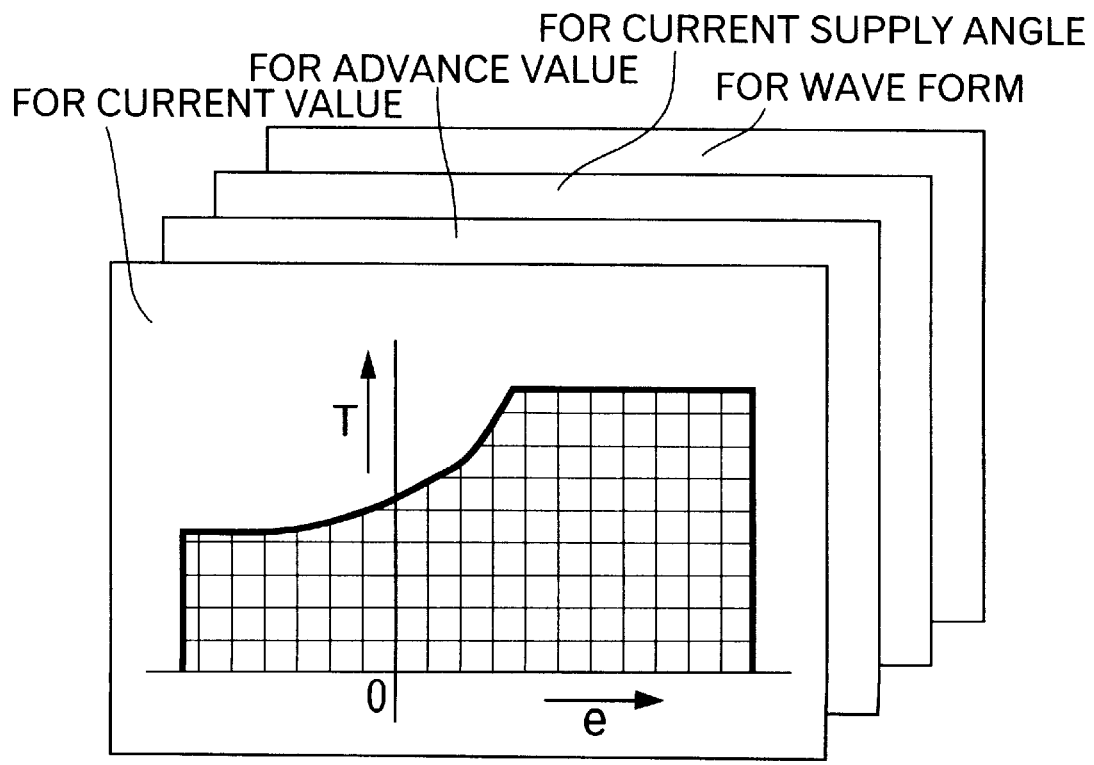

In the control command value map for the current value shown in FIG. 3, the current value has been determined on the assumption that an advance value control (a field reducing control) is carried out. The applied voltage e assuming a minus value is based on the fact that the advance value control is carried out.

Figure 4:
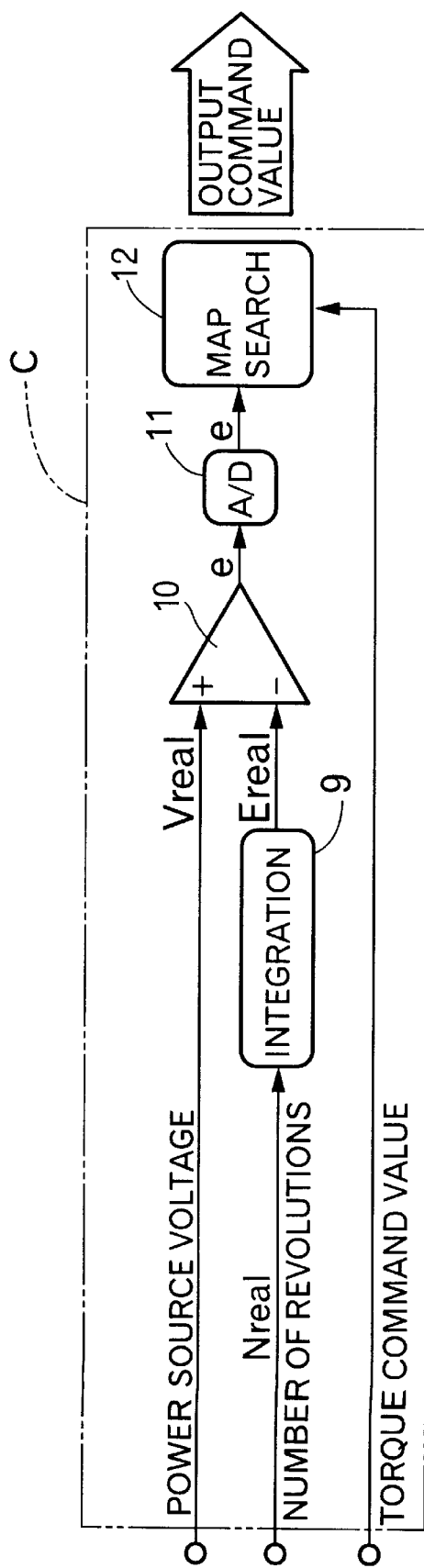

According to the equation (3), the applied voltage e is determined by the power source voltage V, the counter electromotive force constant Ke and the number N of revolutions of the motor M. In order to calculate the applied voltage e and to provide the output command value based on the calculated applied voltage e, the control unit C has an arrangement as shown in FIG. 4.

More specifically, the control unit C includes an integrator 9 for integrating the counter electromotive voltage Ereal generated in the motor M based on the equation (2) from an actual number Nreal of revolutions provided by the pole position/revolution-number detecting sensor 2, a subtracter 10 for subtracting the counter electromotive force Ereal provided by the integrator 9 from an actual power source voltage Vreal provided by the power source voltage detector 8 to provide an applied voltage e which is an analog signal, an A/D converter 11 for converting the applied voltage e which is the analog signal into a digital signal, and a map searching section 12 comprised of a microprocessor for searching an output command value based on the control command value map shown in FIG. 3 in accordance with the torque command value and the applied voltage e as the digital signal outputted from the A/D converter 11.

When the number Nreal of revolutions of the motor M is detected by an encoder, the integrator 9 may be a frequency-voltage converter. The counter electromotive force Ereal may be provided using a tacho-generator.

According to the first embodiment, by previously constituting the control command value map with the applied voltage e and the output torque T taken on the axes of the coordinates based on the fact that the applied voltage e of the motor M and the output torque T from the motor M are proportional to each other, even if the voltage of the motor driving power source 4 is remarkably varied, it is unnecessary to prepare a large number of control command value maps dealing with the variation in power source voltage. Only by carrying out a simple processing for providing the applied voltage e, an output command value for providing an output torque T indicated by a driver can be easily and rapidly provided irrespective of the variation in power source voltage.

Moreover, the counter electromotive force Ereal generated in the motor M can be subtracted from the actual power source voltage Vreal of the motor driving power source 4 to provide the applied voltage e. In addition, an actual number Nreal of revolutions of the motor M and an actual power source voltage Vreal of the motor driving power source 4 can be detected based on the fact that the counter electromotive force Ereal is proportional to the number Nreal of revolutions of the motor M, and an applied voltage e of the motor M can be easily calculated based on the detected number Nreal of revolutions and the detected power source voltage Vreal.

Figure 5:
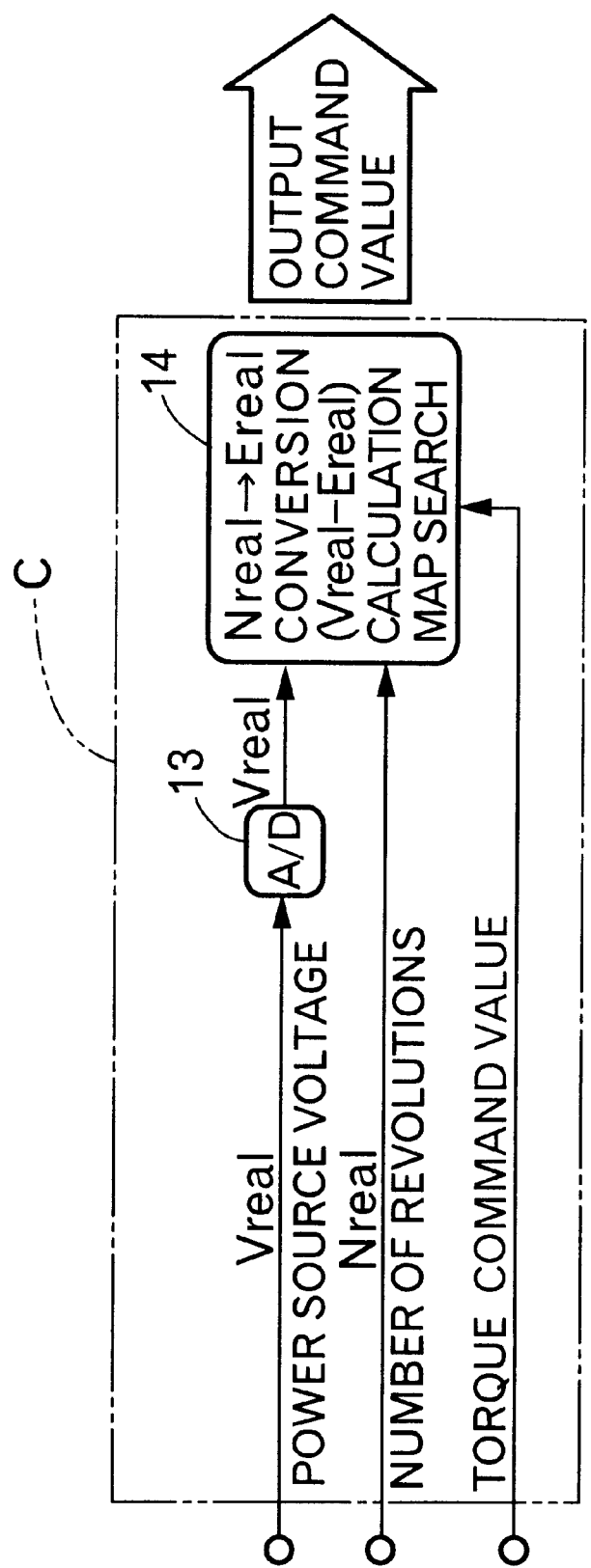
FIG. 5 is a block diagram illustrating the arrangement of a control unit according to a second embodiment.

FIG. 5 illustrates a second embodiment of the control unit C of the present invention. In order to calculate an applied voltage e and provide an output command value based on the calculated applied voltage e, the control unit C includes an A/D converter 13 for converting an actual power source voltage Vreal detected by the power source voltage detector 8 from an analog signal into a digital signal, and a mathematical processing section 14, to which are inputted the power source voltage Vreal which is the digital signal provided by the A/D converter 13, a pulse signal indicative of the actual number Nreal of revolutions detected by the pole position/revolution-number detecting sensor 2 and the torque command value. The mathematical processing section 14 is comprised of a microprocessor.

Carried out in the mathematical processing section 14 are a calculation for providing a counter electromotive force Ereal from the number Nreal of revolutions, a calculation for subtracting the counter electromotive force Ereal from the power source voltage Vreal to provide an applied voltage e, a map search for searching an output command value from the torque command value and the applied voltage e based on the control command value map shown in FIG. 3.

Even according to the second embodiment, an effect similar to that in the first embodiment can be provided.

Figure 6:
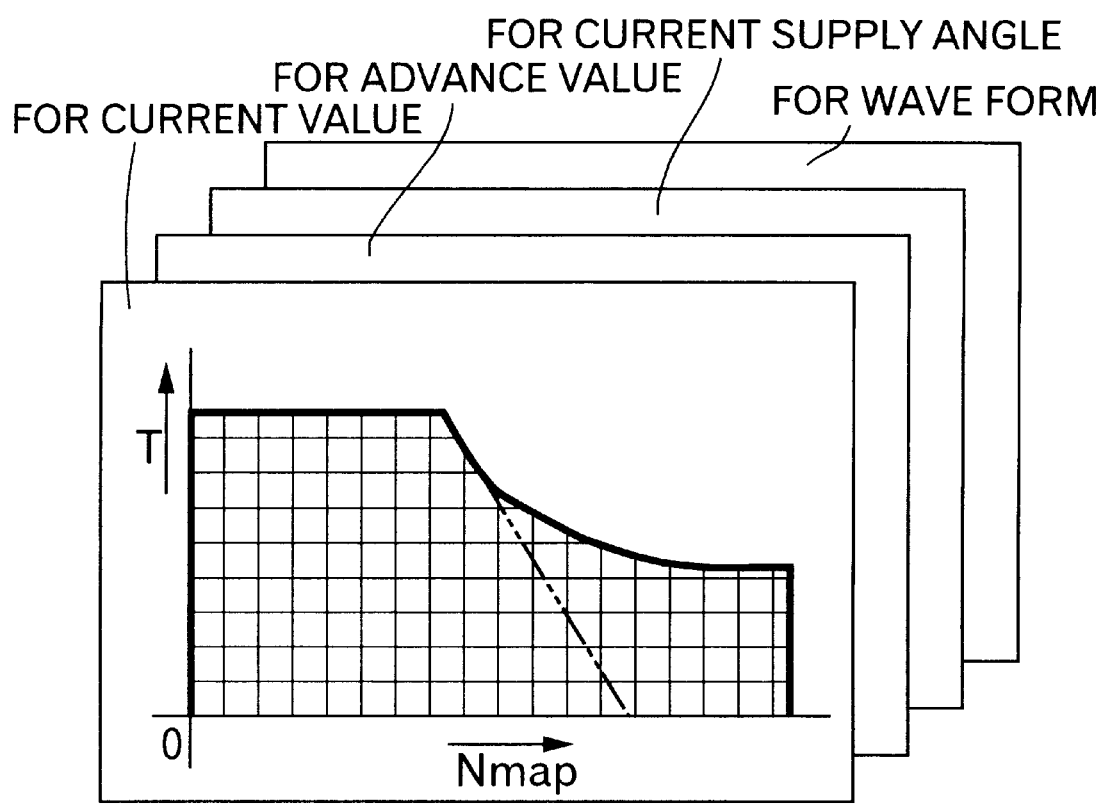
Figure 7:
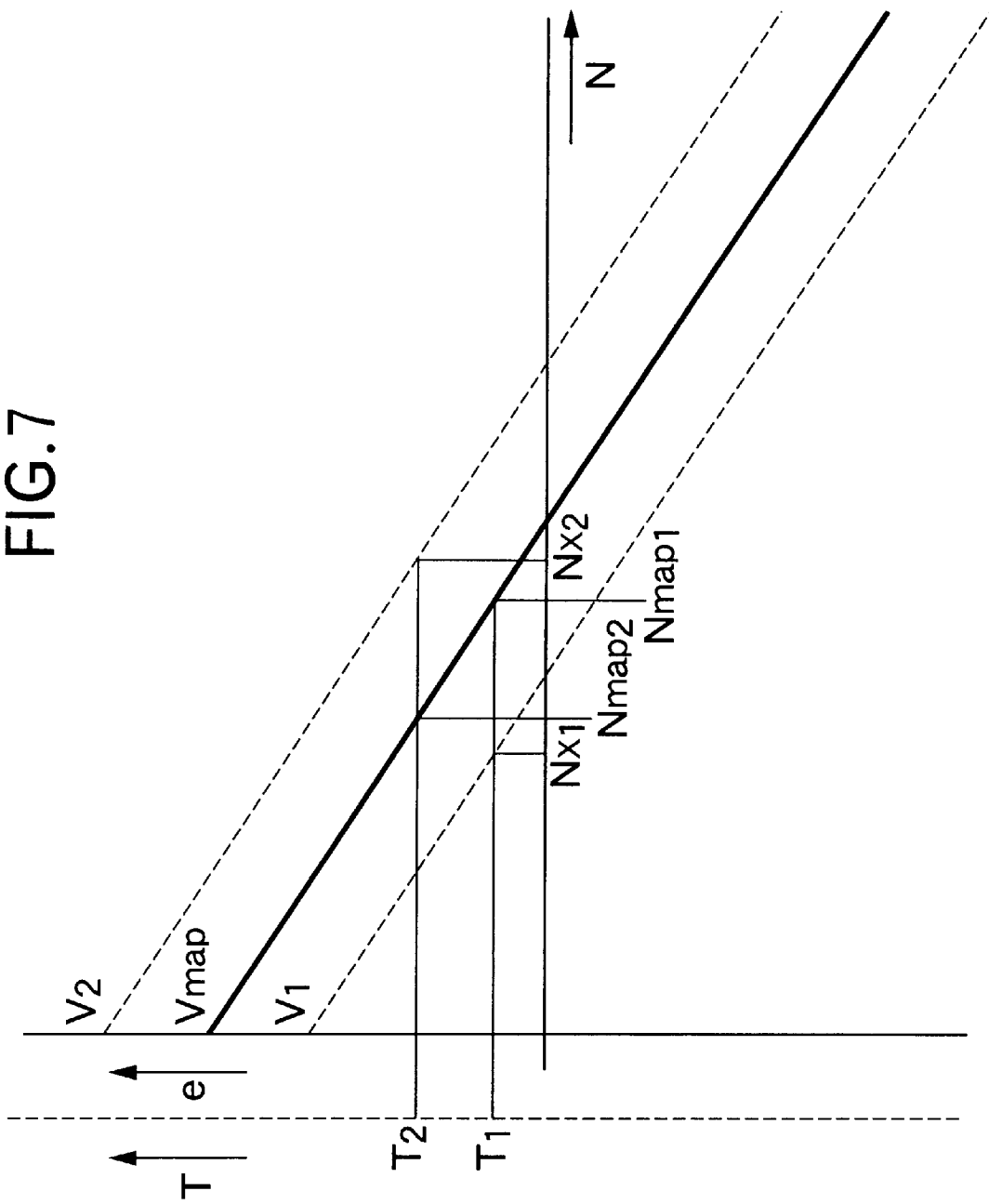
Figure 8:
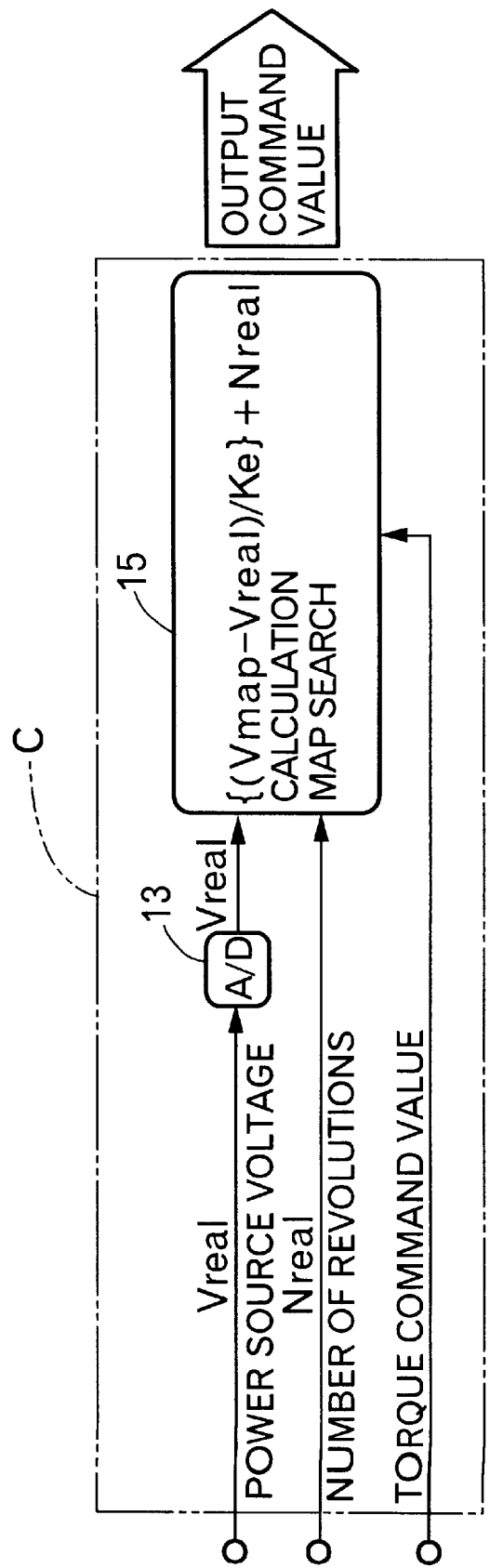

FIGS. 6 to 8 illustrate a third embodiment of the present invention.

A control command value map is previously established, as shown in FIG. 6, in the control unit C, where the output command value has been determined for at least the current value or, more desirably, for the current value and the advance value among the current value, the advance value, the current supply angle and the wave form of the phase current, at an intersection of a mesh on coordinates with the number of revolutions of a motor M taken on the axis of abscissas and the output torque T taken on the axis of ordinate. In establishing this map, the current value, the advance value, the current supply angle and the wave form of the phase current based on the number Nmap of revolutions and the output torque T in a state where the voltage of the motor driving power source 4 is defined as a reference voltage Vmap, may be determined. The control command value map where the output torque T is on a plus side, i.e., on a driving side, is illustrated in FIG. 6, but a control command value map where the output torque T is on a minus side, i.e., on a regenerative side, may be established in the same manner.

In the control command value map for the current value shown in FIG. 6, the current value has been determined on the assumption that an advance value control (a field reducing control) is carried out. If the advance value control is not carried out, then the output torque T is varied as shown by a dashed line, and on the other hand, as the advance value control is carried out, the output torque T is determined to such a range that the number Nmap of revolutions is larger.

The applied voltage e=V−Ke·N from the equation (3) and hence, when the power source voltage V on the establishment of the map is defined as a reference voltage Vmap, the relationship between the number N of revolutions of the motor M and the applied voltage e when the power source voltage V is the reference voltage Vmap, is as shown by a solid line in FIG. 7.

The output torque T from the motor M and the applied voltage e are proportional to each other and hence, to carry out a control wherein even if the power source voltage V is varied, the output torque T is uniform, a control intended to maintain the applied voltage e uniform may be carried out. Here, suppose the case where the power source voltage V of the motor driving power source 4 has been varied from the reference voltage Vmap to $V_1$ (<Vmap), as well as the case where the power source voltage V has been varied from the reference voltage Vmap to $V_2$ (>Vmap). These cases are as shown by broken lines in FIG. 7. When the power source voltage V is equal to $V_1$ (<Vmap), the number of revolutions when an output torque $T_1$ is obtained in a state in which the power source voltage V is equal to the reference voltage Vmap, is equal to Nmap1, whereas the output torque $T_1$ can be obtained with a number Nx1 of revolutions smaller than Nmap1. When the power source voltage V is equal to $V_2$ (>Vmap), the number of revolutions when the output torque $T_2$ is obtained in a state in which the power source voltage V is equal to the reference voltage Vmap, is equal to Nmap2, whereas the output torque $T_2$ can be obtained with a number Nx2 of revolutions larger than Nmap2.

To provide a uniform output torque T (a uniform applied voltage e) when the power source voltage V has been varied in this way, if a counter electromotive force corresponding to the reference voltage Vmap at the time of drawing the map is represented by Ex and the number of revolutions at that time is by Nx, the following equation is established:

$$e = Vreal - Ereal = Vreal - Ke \cdot Nreal \quad (8)$$
$$= Vmap - Ex = Vmap - Ke \cdot Nx$$

A voltage difference ΔV is determined according to the following equation:

$$\Delta V = Vmap - Vreal = Ke \cdot (Nx - Nreal) \quad (9)$$

Thus, by finding a number Nx of revolutions which satisfies the voltage difference ΔV so as to maintain the above-described applied voltage e, an output torque corresponding to a torque command value on the control command value map can be obtained.

If the equation (9) is transformed, the following equation (10) can be obtained:

$$Nx = \{(Vmap - Vreal)/Ke\} + Nreal \quad (10)$$

In the equation (10), the counter electromotive force constant Ke and the reference voltage Vmap are known and hence, an output command value corresponding to a torque command value can be obtained from the control command value map by using a searching number Nx of revolutions found by detecting an actual power source voltage Vreal and an actual number Nreal of revolutions and performing the calculation according to the equation (10) based on such detected values.

In order to calculate the searching number Nx of revolutions and provide the output command value based on the calculated searching number Nx of revolutions, the control unit C includes, as shown in FIG. 8, an A/D converter 13 for converting the actual power source voltage Vreal detected by the power source voltage detector 8 from the analog signal into the digital signal, and a mathematical processing section 15, to which are inputted the power source voltage Vreal which is the digital signal provided by the A/D converter 13, a pulse signal indicative of the actual number Nreal of revolutions detected by the pole position/revolution-number detecting sensor 2 and the torque command value. The mathematical processing section 15 is comprised of a microprocessor.

Carried out in the mathematical processing section 15 are a calculation according to the equation (10), and a map search for searching an output command value from the torque command value and the searching number Nx of revolutions found by such calculation according to the equation (10) based on the control command value map shown in FIG. 6.

According to the third embodiment, a required number Nx of revolutions of the motor M is calculated in accordance with the varied power source voltage, based on the counter electromotive force constant Ke, the reference voltage Vmap, the actual power source voltage Vreal and the actual number Nreal of revolutions of the motor M, and the output command value is obtained from the control command value map using such calculated number Nx of revolutions as the searching number Nx of revolutions. Therefore, it is possible to provide an output torque indicated by the driver irrespective of a variation in power source voltage. Moreover, the control command value map with the number N of revolutions of the motor and the output torque T taken on the axes of the coordinates has conventionally existed, and it is possible to provide easily and rapidly the output command value corresponding to the power source voltage by using such a conventionally existing control command value map without the preparation of a large number of control command value maps dealing with the variation in power source voltage.

A process for finding the searching number Nx of revolutions more easily than that in the third embodiment will be described below as a fourth embodiment.

If the following equations are established in the equation (10):

$$\text{Vreal} = \alpha \cdot \text{Vmap} \quad (11)$$

$$\text{Ereal} = \beta \cdot \text{Vmap} \quad (12)$$

the following is derived:

$$\{\text{Ereal} = \text{Ke} \cdot \text{Nreal}\}$$

and hence, the following equation is established:

$$\begin{aligned}
Nx &= \{(Vmap - Vreal)/Ereal\} + Nreal \quad (13)\\
&= (Vmap - Vreal + Ereal) \cdot Nreal/Ereal\\
&= (Vmap - \alpha \cdot Vmap + \beta \cdot Vmap) \cdot Nreal/(\beta \cdot Vmap)\\
&= (1 - \alpha + \beta) \cdot Nreal/\beta\\
&= (\alpha/\beta) \cdot (1 - \alpha + \beta) \cdot (Vmap/Vreal) \cdot Nreal
\end{aligned}$$

Here, a case where Vreal=Ereal is considered. If $\alpha=\beta$ from the equations (11) and (12), and $\alpha$ and $\beta$ are values near "1", $(1-\alpha+\beta=1)$ is established. Thus, the following equation (14) can be derived from the equation (13):

$$Nx = (Vmap/Vreal) \cdot Nreal \quad (14)$$

Namely, in a range in which the power source voltage V of the motor driving power source 4 and the number N of revolutions of the motor M are limited, it is possible to provide an appropriate output command value corresponding to a variation in power source voltage by finding a searching number Nx of revolutions which satisfies the more simple equation (14).

Figure 9:
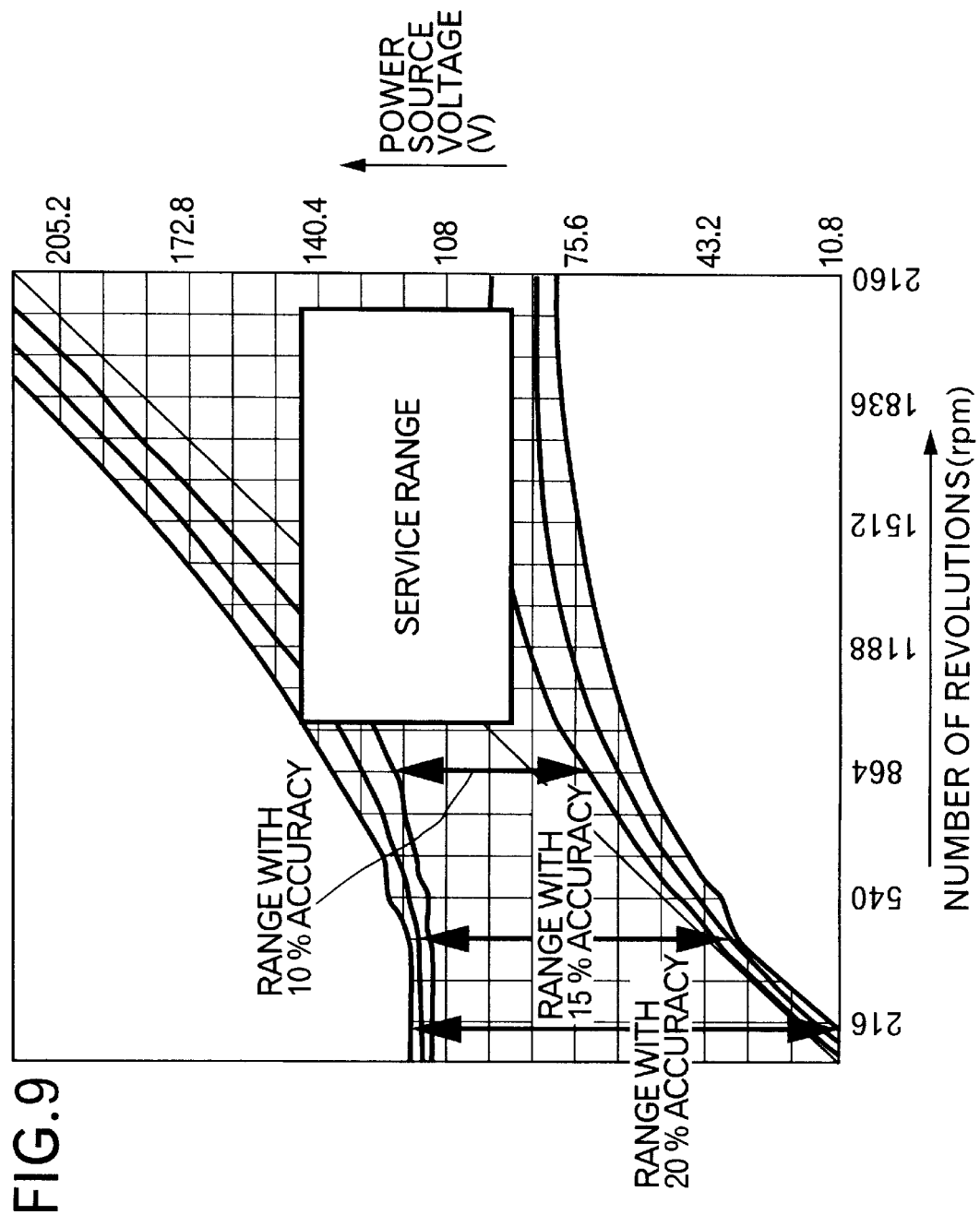
FIG. 9 is a diagram illustrating the accuracy of calculation of a searching number of revolutions according to a fourth embodiment.

The accuracy of the calculation of the searching number Nx of revolutions relative to the power source voltage when found according to the fourth embodiment is as shown in FIG. 9, and an operational range of a highest efficiency is a range in which the power source voltage Vreal and the counter electromotive force Ereal are balanced with each other. If the service range is limited to the range shown in FIG. 9, then it is possible to provide a searching number Nx of revolutions with a value deviated only by 20% at the maximum from the searching number Nx of revolutions found according to the equation (10).

Although the embodiments of the present invention have been described in detail, it will be understood that the present invention is not limited to the above-described embodiments, and various modifications in design may be made without departing from the spirit and scope of the invention defined in claims.

For example, the embodiments have been described using the number N of revolutions as an indication representative of the numbers of revolutions of the motor M, but a number of pulse produced in a defined sampling time which is determined by an encoder mounted to the motor M or a rotation sensor corresponding to the encoder may be measured, and such number of the pulses may be used in place of the number of revolutions. Independently of the encoder or the rotation sensor, a fast clock may be placed, so that a number of pulses of the fast clock within a defined section of an output signal from the encoder or the rotation sensor may be measured and used in place of the number of revolutions. In such a case, the axis of abscissas is the number of pulses in the control command value map shown in FIG. 6.

What is claimed is:

1. A control process in a motor driving control unit comprising an output command value determining means which includes a control command value map where output command values determined based on characteristic data for a motor are stored and which outputs an output command value read from the control command value map in accordance with an output command value from a driver, and a driving means for driving the motor based on the output command value outputted from the output command value determining means, wherein the control command value map is formed with a voltage applied to the motor and an output torque as the output command value from the driver being taken on axes of coordinates, and an output command value determined from the control command value map is applied from the output command value determining means to the driving means.

2. A control process in a motor driving control unit according to claim 1, wherein a number of revolutions of said motor and an actual power source voltage of the motor driving power source are detected, and a voltage applied to said motor by said driving means is calculated based on at least the detected number of revolutions and power source voltage.

3. A control process in a motor driving control unit according to claim 2, wherein the applied voltage e to said motor is calculated according to equations, E=Ke·Nreal and e=Vreal−Ereal, wherein E represents a counter electromotive force of said motor; Ke represents a counter electromotive force constant for said motor; Ereal represents a counter electromotive force generated in said motor; Vreal represents an actual power source voltage; and Nreal represents a detected number of revolutions of said motor.

4. A control process in a motor driving control unit comprising an output command value determining means which includes a control command value map where output command values determined based on characteristic data for a motor are stored and which outputs an output command value read from said control command value map in accordance with an output command value from a driver, and a driving means for driving said motor based on the output command value outputted from said output command value determining means, wherein the control command value map is previously formed with the output torque as the output command value from the driver and the number of revolutions of the motor being taken on axes of coordinates, in a state in which the voltage of a motor driving power source for said motor assumes a reference voltage; a searching number of revolutions is determined based on a counter electromotive force constant for said motor, said reference voltage, an actual power source voltage of said motor driving power source, and an actual number of revolutions of said motor; and an output command value obtained from said control command value map in correspondence to the searching number of revolutions and the output torque is applied from said output command value determining means to said driving means.

5. A control process in a motor driving control unit according to claim 4, wherein a searching number of revolutions Nx is calculated according to an equation, $$Nx=\{(Vmap-Vreal)/Ke\}+Nreal$$

wherein Vmap represents a reference voltage of said motor driving power source; Ke represents a counter electromotive force constant for said motor; Vreal represents an actually detected power source voltage of said motor driving power source; and Nreal represents an actually detected number of revolutions of said motor.

6. A control process in a motor driving control unit according to claim 4, wherein a searching number Nx of revolutions of said motor is calculated according to an equation, $$Nx=(Vmap \cdot Nreal)/Vreal$$

wherein Vmap represents a reference voltage of said motor driving power source; Vreal represents an actually detected power source voltage of said motor driving power source; and Nreal represents an actually detected number of revolutions of said motor.

7. A control process in a motor driving control unit of an electric vehicle comprising an output command value determining means for outputting an output command value to a driving means for driving a vehicle motor, wherein said output command value determining means includes a control command value map formed on the basis of graph coordinates with at least one of either an actual voltage applied to the motor and a number of revolutions of the motor as one axis of said coordinates and an output torque command from a vehicle driver as the other axis of the coordinates for determining an output command value that is applied from said output command value determining means to the driving means for driving the motor.

8. A control process in a motor driving control unit according to claim 7, wherein said one axis of said coordinates is the actual voltage applied, the number of revolutions of said motor and an actual power source voltage of a motor driving power source are detected, and the actual voltage applied to said motor by said driving means is calculated based on at least the detected number of revolutions and power source voltage.

9. A control process in a motor driving control unit according to claim 8, wherein the applied voltage e to said motor is calculated according to equations, $E=Ke \cdot Nreal$ and $e=Vreal-Ereal$, wherein E represents a counter electromotive force of said motor; Ke represents a counter electromotive force constant for said motor; Ereal represents a counter electromotive force generated in said motor; Vreal represents an actual power source voltage; and Nreal represents a detected number of revolutions of said motor.

10. A control process in a motor driving control unit according to claim 7, wherein said one axis of coordinates of said control command value map is the number of revolutions of the motor in a state in which the voltage of the motor driving power source assumes a reference voltage; a searching number of revolutions is determined based on a counter electromotive force constant for said motor, said reference voltage, an actual power source voltage of a motor driving power source, and an actual number of revolutions of said motor; and said output command value is obtained from said control command value map in correspondence to the searching number of revolutions and the output torque for applying from said output command value determining means to said driving means.

11. A control process in a motor driving control unit according to claim 10, wherein a searching number of revolutions Nx is calculated according to an equation, $$Nx=\{(Vmap-Vreal)/Ke\}+Nreal$$

wherein Vmap represents a reference voltage of said motor driving power source; Ke represents a counter electromotive force constant for said motor; Vreal represents an actually detected power source voltage of said motor driving power source; and Nreal represents an actually detected number of revolutions of said motor.

12. A control process in a motor driving control unit according to claim 10, wherein a searching number Nx of revolutions of said motor is calculated according to an equation, $$Nx=(Vmap \cdot Nreal)/Vreal$$

wherein Vmap represents a reference voltage of said motor driving power source; Vreal represents an actually detected power source voltage of said motor driving power source; and Nreal represents an actually detected number of revolutions of said motor.

* * * * *